(12) United States Patent
Kitamura

(10) Patent No.: US 10,343,278 B2
(45) Date of Patent: Jul. 9, 2019

(54) MEASURING APPARATUS, MEASURING METHOD, AND ARTICLE MANUFACTURING METHOD

(71) Applicant: CANON KABUSHIKI KAISHA, Tokyo (JP)

(72) Inventor: Tsuyoshi Kitamura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 63 days.

(21) Appl. No.: 15/292,822

(22) Filed: Oct. 13, 2016

(65) Prior Publication Data

US 2017/0109876 A1    Apr. 20, 2017

(30) Foreign Application Priority Data

Oct. 16, 2015   (JP) ................................. 2015-204420

(51) Int. Cl.
*B25J 9/16* (2006.01)
*G06T 7/62* (2017.01)
*G06T 7/70* (2017.01)

(52) U.S. Cl.
CPC .......... *B25J 9/1612* (2013.01); *B25J 9/1697* (2013.01); *G06T 7/62* (2017.01); *G06T 7/70* (2017.01)

(58) Field of Classification Search
CPC ......... B25J 9/1697; B25J 9/1612; G06T 7/70; G06T 7/62
See application file for complete search history.

(56) References Cited

U.S. PATENT DOCUMENTS

| 2005/0157908 A1* | 7/2005 | Matsugu ............ G06K 9/00342 382/107 |
| 2006/0097132 A1* | 5/2006 | Nam .................. H01L 27/14603 250/208.1 |
| 2013/0230211 A1* | 9/2013 | Tanabiki ............ G06K 9/00342 382/103 |
| 2016/0229061 A1* | 8/2016 | Takizawa ............... B25J 9/1694 |
| 2016/0335485 A1* | 11/2016 | Kim ................... G06K 9/00335 |
| 2017/0075502 A1* | 3/2017 | Kurz ..................... G06T 19/006 |
| 2017/0116473 A1* | 4/2017 | Sashida .............. G06K 9/00382 |

FOREIGN PATENT DOCUMENTS

| JP | H11295036 A | 10/1999 |
| JP | 2010247959 A | 11/2010 |

OTHER PUBLICATIONS

Office Action issued in Japanese Appln. No. 2015-204420 dated Oct. 2, 2018. English Translation provided.

* cited by examiner

*Primary Examiner* — Brenda C Bernardi
(74) *Attorney, Agent, or Firm* — Rossi, Kimms & McDowell LLP

(57) ABSTRACT

A measuring apparatus comprises an image sensor configured to image an object; and a processor configured to obtain information of a position, posture or both thereof of a first object, and a contact between the first object and a second object different from the first object based on an output of the image sensor, and perform evaluation of the information based on the contact.

10 Claims, 5 Drawing Sheets

FIG. 6A
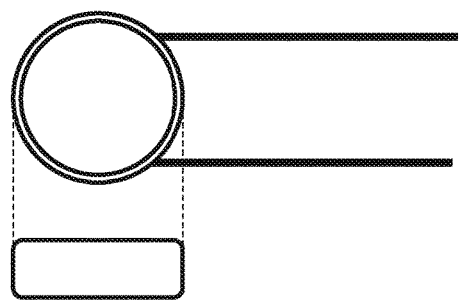
FIG. 6B
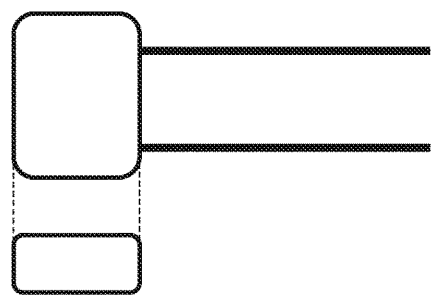
FIG. 7A
FIG. 7B          FIG. 7C          FIG. 7D          FIG. 7E
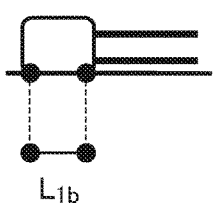 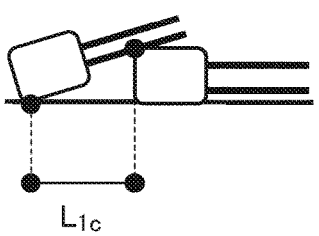 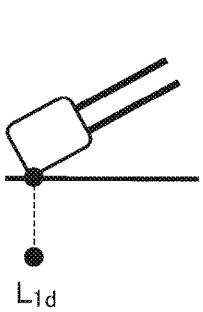 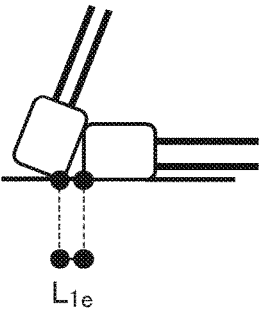
$L_{1b}$          $L_{1c}$          $L_{1d}$          $L_{1e}$ FIG. 8A
FIG. 8B        FIG. 8C        FIG. 8D        FIG. 8E
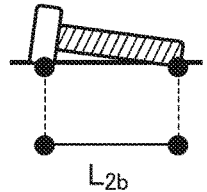   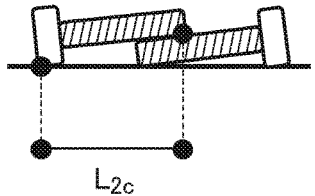   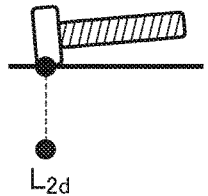   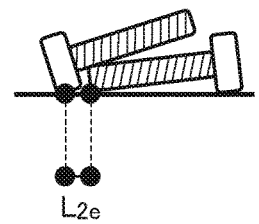

MEASURING APPARATUS, MEASURING METHOD, AND ARTICLE MANUFACTURING METHOD

BACKGROUND OF THE INVENTION

Field of the Invention

The present invention relates to a measuring apparatus, a measuring method, and a method of manufacturing an article.

Description of the Related Art

As an important technical element in the field of machine vision, there has been known a technique that measures the position and posture of an object. Japanese Patent Application Laid-Open Publication No. 11-295036 discloses a method that determines a direction of an electronic component by examining a matching degree (correlation degree) between a pattern of a direction detection template and a pattern in an input image. Additionally, in the field of machine vision, a three-dimensional measurement technique of an object has been known. This technique is applicable to the obtaining of the position and posture information for the object. The obtained position and posture information is used, for example, for the control of a robot arm that grips the object.

For example, when the robot arm is controlled based on the position and posture information that has been measured incorrectly in a situation such as a randomly piling of electronic components and the like, there may be cases in which the gripping of the object and a predetermined purpose by the gripping cannot be achieved. Additionally, if the position and posture of the object are unstable, they may change during a period of time between the measurement and the gripping. Also due to this change, there may be cases in which the gripping of the object and a predetermined purpose to be attained by the gripping cannot be achieved.

SUMMARY OF THE INVENTION

The present invention provides, for example, a technique advantageous in evaluating measurement of a position, posture or both thereof of an object.

In order to solve the above problems, the present invention has a measuring apparatus comprising: an image sensor image an object; and a processor that obtains information of a position, posture or both thereof of a first object, and a contact between the first object and a second object different from the first object based on an output of the image sensor, and perform evaluation of the information based on the contact.

Further features of the present invention will become apparent from the following description of exemplary embodiments with reference to the attached drawings.

BRIEF DESCRIPTION OF THE DRAWINGS

FIG. 6A illustrates a schematic shape of an example of a measurement target in the second embodiment.

FIG. 6B illustrates a schematic shape of an example of a measurement target in the second embodiment.

FIG. 7A illustrates a detected posture of the object in a third embodiment.

FIG. 7B illustrates a detected posture of the object in the third embodiment.

FIG. 7C illustrates a detected posture of the object in the third embodiment.

FIG. 7D illustrates a detected posture of the object in the third embodiment.

FIG. 7E illustrates a detected posture of the object in the third embodiment.

FIG. 8A illustrates a detected posture of the object in the third embodiment.

FIG. 8B illustrates a detected posture of the object in the third embodiment.

FIG. 8C illustrates a detected posture of the object in the third embodiment.

FIG. 8D illustrates a detected posture of the object in the third embodiment.

FIG. 8E illustrates a detected posture of the object in the third embodiment.

DESCRIPTION OF THE EMBODIMENTS

First Embodiment

Figure 1:
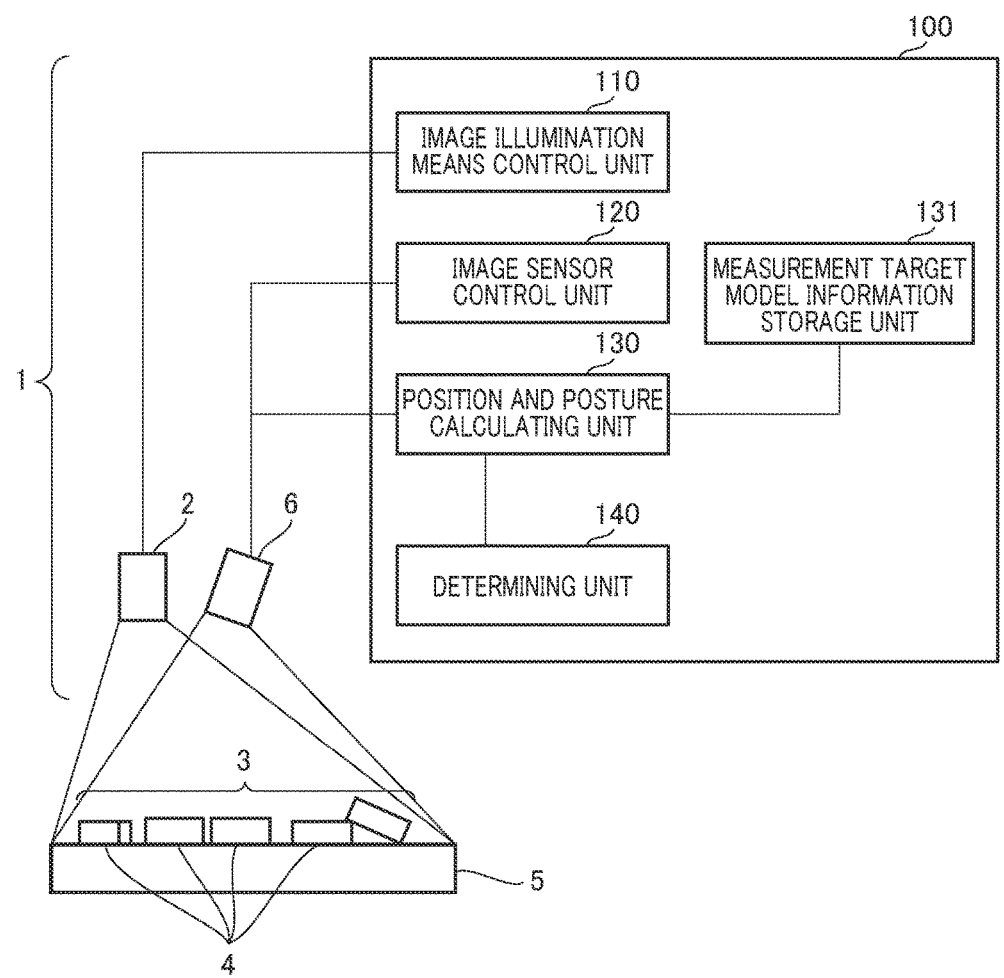
FIG. 1 illustrates a position and posture measuring apparatus in the present invention.

FIG. 1 is an example of a position and posture measuring apparatus of the present embodiment. A position and posture measurement apparatus 1 includes an image illumination unit 2 that is configured by a light source such as an LED and an optical system such as a lens. The image illumination unit 2 projects a light based on a command issued from an image illumination unit controller 110 provided in an information processor or processor 100. A measurement target 3 of the present apparatus includes a plurality of objects 4. The plurality of objects 4 is arranged in various postures on a substantially flat surface 5, which serves as a mounting surface. In the use of the position and posture measuring apparatus 1 that is presumed in the present invention, a wide variety of electronic components, for example, a connector, a transistor, and a capacitor are presumed to serve as the objects 4, and a surface having a tray or a conveyor where the components are placed is presumed to serve as the substantially flat surface 5. The light described above is projected to the measurement target 3 arranged on the substantially flat surface 5. This state is captured by an image sensor 6 that is configured by an optical system such as a CCD and a lens based on a command issued from an image sensor controller 120 provided in the information processor or processor 100.

The captured image is transmitted to the information processor 100 as image data. In a measurement target model information storage unit 131 in the information processor 100, 3DCAD model information for the measurement target 3 and calibration information representing a geometrical arrangement relation between the image illumination unit 2 and the image sensor 6 are recorded in advance. In a position and posture calculating unit 130, which serves as a measuring unit, three-dimensional information for each of the objects 4 that are present in the image, that is, the position and posture (position, posture or both thereof), is calculated based on the captured image data and the information stored in the measurement target model information storage unit 131. Specifically, a shape model of two-dimensional projection that has been produced in advance from the 3DCAD model of the measurement target is compared with the outline information and feature information for the measurement target in the image that has actually been obtained. Subsequently, the shape model for which a matching score by an evaluation function that represents a matching degree of the result for comparison is the best (for example, maximum or minimum) is specified, and consequently, the position and posture of the measurement target 3 is determined. This apparatus configuration and method are typically known as an example of the position and posture measuring apparatus.

Some of the results for the position and posture calculated by the position and posture calculating unit 130 show the position and posture that are different from the position and posture of the actual object 4, in other words, the occurrence of the erroneous detection. In particular, in the position and posture calculation method described above, an error is likely to occur in the position in the vertical direction of the contact surface and the posture by a rotation component with respect to the two axes that form the substantially flat surface 5. Such an erroneous detection is difficult determine using only the "good or bad" of the matching score.

Next, a description will be given of a determining unit 140 (that determines whether the measurement is usable) that is a feature of the present invention. In the determining unit 140 that serves as an evaluation unit, evaluation is performed about whether the position and posture of the object 4 that was derived by the above process is correct, it is an erroneous detection, or the posture is unstable. Based on this evaluation result, the determination is performed about whether the position and posture of the object 4 that has been measured is suitable for adoption as a measurement result.

The above described determination is performed based on an area of a figure that is formed by projecting a plurality of contacts, which is a part where the object 4 is in contact with the substantially flat surface 5 or another object, to a predetermined surface, for example, the substantially flat surface 5 (hereinafter, referred to as "contact group projection maximum area"). Note that the contact in the present invention is determined as the intersection between the result for the position and posture calculation of the object 4 that has been calculated and the substantially flat surface 5, or the intersection coordinates between the result for the position and posture calculation of the object 4 and the result for the position and posture calculation of an adjacent object. Actually, because measurement errors are included in the position and posture calculation result, in addition to the intersection coordinates that intersect completely, a point that exists within a minute fixed range is regarded as a contact (a contacting part) and derived. In the present embodiment, an electronic component that is a substantially cubic or a substantially rectangular parallelepiped is presumed to serve as the measurement target 3, and its adoption availability determination method will be described.

Figure 2A:
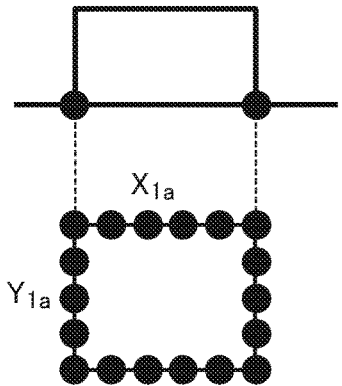
FIG. 2A illustrates a detected posture when the object is isolated in a first embodiment.
Figure 2B:
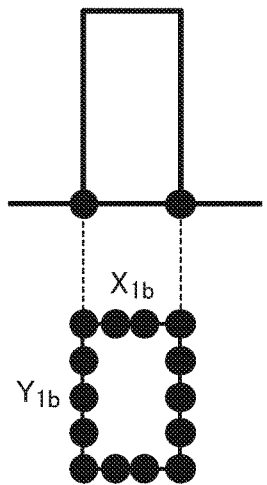
FIG. 2B illustrates a detected posture when the object is isolated in the first embodiment.
Figure 2C:
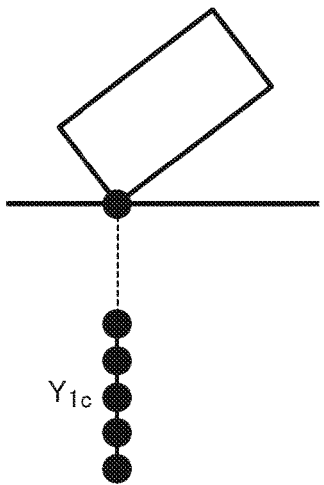
FIG. 2C illustrates a detected posture when the object is isolated in the first embodiment.

FIG. 2 illustrates three types of postures, with respect to the result for the position and posture calculation when the object 4 is in contact with only the contact surface. In the postures shown in FIG. 2A and FIG. 2B, a given surface of the object 4 is in contact with the substantially flat surface 5. In these cases, the contact group projection maximum area of each of the object 4 is an area that is a surface itself of the object 4 that is in contact with the substantially flat surface 5, and each of which is represented by $X_{1a} \times Y_{1a}$, and $X_{1b} \times Y_{1b}$. In contrast, in the posture shown in FIG. 2C, only one side of the object 4 is in contact with the substantially flat surface 5. In this case, the maximum area that is formed by the contact group in which the object 4 is in contact with the contact surface is zero.

Figure 3A:
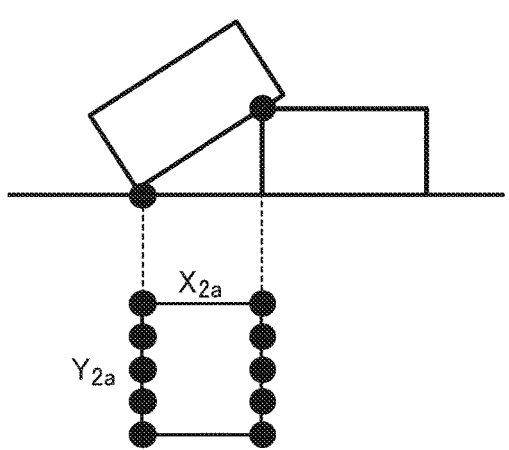
FIG. 3A illustrates a detected posture when the object is in contact with another object in the first embodiment.
Figure 3B:
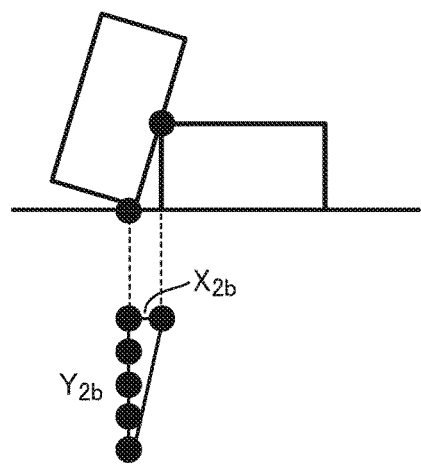
FIG. 3B illustrates a detected posture when the object is in contact with another object in the first embodiment.
Figure 4A:
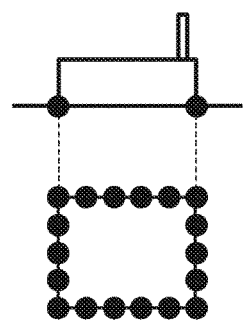
FIG. 4A illustrates a detected posture when the object is isolated in a second embodiment.
Figure 4B:
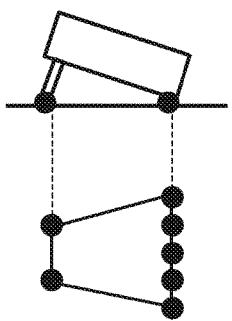
FIG. 4B illustrates a detected posture when the object is isolated in the second embodiment.
Figure 4C:
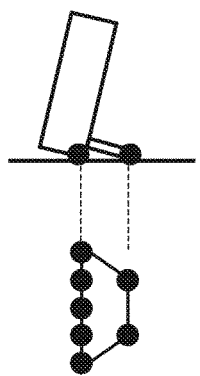
FIG. 4C illustrates a detected posture when the object is isolated in the second embodiment.
Figure 4D:
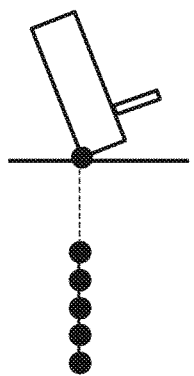
FIG. 4D illustrates a detected posture when the object is isolated in the second embodiment.
Figure 5A:
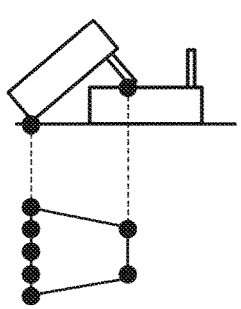
FIG. 5A illustrates a detected posture when the object is in contact with another object in the second embodiment.
Figure 5B:
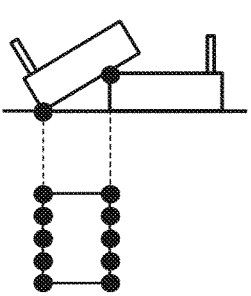
FIG. 5B illustrates a detected posture when the object is in contact with another object in the second embodiment.
Figure 5C:
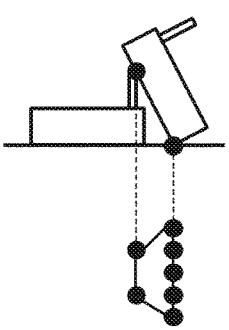
FIG. 5C illustrates a detected posture when the object is in contact with another object in the second embodiment.
Figure 5D:
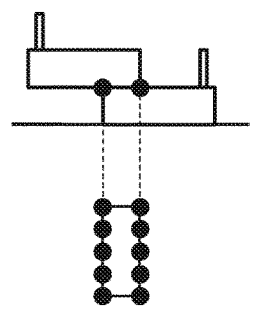
FIG. 5D illustrates a detected posture when the object is in contact with another object in the second embodiment.

FIG. 3 illustrates two types of postures with respect to the result for the position posture calculation when the object 4 is in contact with the contact surface and an adjacent component (another object). In the slightly tilted posture shown in FIG. 3A, one side of the object 4 is in contact with the substantially flat surface 5. In contrast, a given surface of the object 4 is in contact with a side of the adjacent component as well, and the contact group projection maximum area becomes a rectangular area $X_{2a} \times Y_{2a}$, shown in the drawing. In the largely tilted posture shown in FIG. 3B, one side of the object 4 is in contact with the substantially flat surface 5, and a given surface of the object 4 is in contact with an apex of the adjacent component in a point-contact state. In this case, the contact group projection maximum area becomes a triangular area $X_{2b} \times Y_{2b} \times \frac{1}{2}$, shown in the drawing.

A description will be given of the adoption appropriateness of each measurement position described above. The postures of FIGS. 2A and 2B are physically possible as is obvious, and they are stable as isolated components. Accordingly, these calculation postures are considered to be appropriate, and should be adopted as the measurement result. In contrast, it is clear that the posture shown in FIG. 2C is not a posture that can be taken as an isolated component. It is appropriate that such a posture is considered to have occurred due to an erroneous detection, and the posture should not be adopted as the measurement result. In FIG. 3A, the object 4 slightly tilts, and is supported by one side of the adjacent component. It can be said that such a state is physically possible as is obvious, and is a relatively stable posture. In contrast, in FIG. 3B, the object 4 tilts significantly, and is supported by one apex of the adjacent component. While such a state is physically possible as is obvious, it can be said that, in the sense of posture stability of the object 4, the state is a very unstable. Accordingly, even if the state shown in FIG. 3B has been recognized correctly as a posture during the obtaining of images, it is conceivable that the state changes when the robot moves and performs gripping. In this case, similar to the case in which a command based on erroneous detection was issued, the robot may interfere with the object 4 and the substantially flat surface 5. When considering the extent of the damage when interference occurs, an unstable posture shown in FIG. 3B should also not be adopted as the measurement result.

The adoption suitability of these can easily be determined by the contact group projection maximum area described above. With respect to the postures of FIGS. 2A and B, which are suitable adoptions, the contact group projection maximum area is the rectangular area that is a side surface of the component, and with respect to the posture of FIG. 2C, which is an inappropriate adoption, the contact group projection maximum area is zero. Additionally, if comparing the contact group projection maximum area of FIG. 3A, which is appropriate adoption, with that of FIG. 3B, which is an inappropriate adoption, the former is larger. This is because the length of the side of each contact group projection surface, $X_{2a}$, $X_{2b}$, is inversely proportional to the tilt of the object 4, that is, $X_{2b}$ corresponding to FIG. 3B, which shows the significantly tilted posture is shorter. Additionally, in FIG. 3A, which shows a stable support by the side of the adjacent component, the contact group projection surface forms a rectangle. In contrast, in FIG. 3B, which shows an unstable support by one apex, the contact group projection surface forms a triangle, and it can be seen that, in the posture that is inappropriate adoption, the area of the contact group projection surface is small.

Accordingly, the adoption suitability of the measurement posture can be determined by setting a determination threshold that is a tolerance to the contact group projection maximum area in advance. For example, with respect to a plurality of postures that can be taken by the object 4, an adopted posture and a non-adopted posture are set in advance by using a stability reference based on the posture and information for the center of gravity, and consequently, the threshold can be set by the maximum value of the contact group projection maximum area in which the plurality of non-adopted postures can be taken. The threshold is determined based on an area of the figure or the length of line segment that is formed by dots obtained by projecting presumed contacts with the substantially flat surface or the adjacent component that are set in the size information, a material, and a structure of the object, a plurality of presumed postures that can be taken by the object in addition to the information for the center of gravity, to the mounting surface. Thus, in the determining unit 140, the contact group projection maximum area is compared with the determination threshold, and as a result, the determination of the adoption suitability of the measurement result becomes possible. Note that the example of the posture adoption suitability in the present specification shows an example of the determination, and actually, even in the same posture, there are cases in which the determination that differs from the above suitability determination is needed, depending on the conditions, for example, the material, the position of center of gravity, or the minute structure. However, setting a threshold in advance appropriately for each component by the method described above enables a determination adapted to those.

The position and posture measurement apparatus 1 in the present embodiment is connected to a robot control unit (not illustrated), and performs control of a robot arm and the like, based on the position and posture information for the object 4 that is issued from the position and posture measuring apparatus 1. Specifically, in order from the object 4 that has a high matching score showing a degree of matching in the measurement target 3 that calculated the position posture, the adoption suitability of the measurement result for the measurement target 3 that satisfies the predetermined condition is determined. Note that the predetermined condition is, for example, that the value of the evaluation function is a minimum. Subsequently, if the measurement result is determined to be a grippable one that is suitable for adoption, based on that, a subsequent process such as gripping by the robot arm is performed. In contrast, the measurement result that was determined to be unsuitable for adoption is not adopted. This is because, if the result is adopted, there are cases in which the gripping of the object or the predetermined purpose to be attained by the gripping cannot be achieved. If the result is not adopted, that may be displayed on a display unit (not illustrated).

If the position and posture information is incorrect or a state from the measurement of the posture to the contact of the object 4 and the robot arm is unstable, such as a change of the posture occurring, the robot arm may interfere or collide with the object 4 and the substantially flat surface 5. Accordingly, there is a risk that a serious damage to the robot or a production line will occur. However, by providing the determining unit 140 as described above, the erroneous detection or the position and posture measurement results that detected an unstable posture being transmitted to the robot control unit can be suppressed, and the occurrence of interference and collision can thereby be suppressed.

Second Embodiment

In the first embodiment, although an electronic component that is a substantially cubic or a substantially rectangular parallelepiped was used as an example of the measurement target 3, the actual electronic component is often not formed in such a simple shape. For example, although the housing of the connector is often configured by an insulating material of a substantially cubic shape or a substantially rectangular parallelepiped shape, there are cases in which a metal pin is exposed, or a protrusion is present on the housing itself. The present embodiment shows that the measurement result adoption suitability determination method described in the first embodiment is also applicable to a component that is formed in a different shape and has a complex structure.

An example of the apparatus configuration of the position and posture measuring apparatus 1 in the second embodiment is that shown in FIG. 1, and it is shared by the first embodiment. In the second embodiment, a substantially rectangular parallelepiped-connector component with an exposed pin is presumed as the measurement target 3. In the object 4 as shown in the present embodiment, a situation such that the pin, which is a protruding unit, and a side of substantial rectangular parallelepiped contacts the substantial flat surface 5 is presumed. Even in such a case, the measurement result adoption suitability determination using a contact group projection maximum area shown in the first embodiment is effective.

FIG. 4 illustrates examples of the position and posture when a substantially rectangular parallelepiped-connector component with the exposed pins is isolated. For example, as shown in FIG. 4A and FIG. 4B, the large sized-contact group projection maximum area is considered to be the result for a position and posture detection measurement in which the object 4 tilts slightly and the posture is stable. Hence, these calculation postures are considered to be appropriate, and they should be adopted as the measurement result. In contrast, as shown in FIG. 4C, the small sized contact group projection maximum area is considered to be the result for a position and posture detection measurement in which the object 4 tilts significantly and the posture is unstable. In the posture shown in FIG. 4D, only one side of the object 4 is in contact with the substantially flat surface 5, and the contact group projection maximum area is zero. Such a posture is not a posture that can be taken as an isolated component, it is appropriate to consider the posture to have occurred due to an erroneous detection, and therefore, the posture should not be adopted as the measurement result. Thus, also with respect to the substantially rectangular parallelepiped-connector component with the exposed pin, it is possible to determine the adoption suitability of these postures by appropriately setting the threshold in a manner that is similar to that of the first embodiment.

FIG. 5 illustrates examples of the position posture when the substantially rectangular parallelepiped-connector component with the exposed pin is in contact with an adjacent component. For example, a case in which the contact group projection maximum area is large as shown in FIG. 5A and FIG. 5B is considered to be a result for the position and posture detection measurement in which the object 4 slightly tilts and the posture is stable. Accordingly, these calculation postures are considered to be appropriate, and should be adopted as the measurement result. In contrast, as shown in FIG. 5C and FIG. 5D, the small sized-contact group projection maximum area is considered to be the result for the position and posture detection measurement in which the posture is unstable. Even if the states of FIG. 5C and FIG. 5D are correctly recognized as the posture during the obtaining of images, it is conceivable that the state changes when the robot moves and performs gripping. In this case, in a manner similar to a case in which the command based on the erroneous detection was issued, the robot may interfere with the object 4 and the substantially flat surface 5. When considering the amount of the damage upon interference, the unstable postures as shown in FIG. 5C and FIG. 5D should not be adopted as the measurement result. Thus, also in the example of the position and posture in a case in which the substantially rectangular parallelepiped connector component with the exposed pins is in contact with the adjacent part, the adoption suitability of the measurement posture can be determined by calculating the contact group projection maximum area and comparing it with the threshold set in advance.

In the present embodiment, although an electronic component in which the housing is a substantial cubic or a substantially rectangular parallelepiped was described, the effect of the present invention is not lost even with respect to parts having other various shapes. For example, FIG. 6A illustrates a low height cylindrical component such as a multilayer ceramic capacitor, and FIG. 6B illustrates a round rectangular parallelepiped component such as a radial leaded film capacitor. Also in the components shown in FIG. 6A and FIG. 6B, the effect of the above adoption suitability determination is fixed in so far as the contact group projection maximum area can be calculated. Additionally, a measure to be compared with the threshold is not limited to the area and the length of line segment, and, for example, a value, such as a distance and the like, that can be calculated based on the figure that was obtained by projection may be used.

As described above, even for components in which the object has a complicated structure, the measurement result adoption suitability determination method described in the first embodiment can be applied. Therefore, providing the determining unit 140 enables suppressing the transmittance of the erroneous detection or position and the posture measurement result that detected unstable posture to the robot control unit, and consequently, the occurrence of the interference and collision can be suppressed.

Third Embodiment

In the first embodiment and the second embodiment, the adoption suitability determination of the position and posture measurement result is performed based on the contact group projection maximum area. However, with respect to a cylindrical component such as an electrolytic capacitor or a screw that line-contacts or point-contacts the surface, and not surface-contacting it, when the component is disposed on the substantially flat surface 5, it is useful to perform the adoption suitability determination by the length of the maximum line segment formed by the contact group, instead of a contact group projection maximum area.

FIG. 7 illustrates examples of the detected posture of an electrolytic capacitor. As shown in FIGS. 7B to 7E, a cylindrical component as shown in FIG. 7A line-contacts or point-contacts the substantially flat surface 5 and the adjacent component. In this case, instead of an area of a figure obtained by projecting the contact group to the substantially flat surface 5, a length of line segment of the figure obtained by projecting the contact group to the substantially flat surface 5 is compared with the threshold set in advance, and an erroneous detection and determination of an unstable posture can thereby be performed. For example, as shown in FIG. 7B and FIG. 7C, a case in which each length of line segments $L_{1b}$ and $L_{1c}$ is longer than a threshold can be determined as an adopted posture. In contrast, as shown in FIG. 7D, a case in which the component point-contacts the substantially flat surface 5 and the adjacent components, instead of line-contact, and a case in which the length of line segment $L_{1d}$ is zero can be determined as non-adopted posture, and as shown in FIG. 7E, a case in which the length of line segment $L_{1e}$ is less than a threshold can be determined as non-adopted posture.

FIG. 8 illustrates examples of the detected posture of the screw. As shown in FIG. 8A to FIG. 8E, the component shown in FIG. 8A point-contacts the substantially flat surface 5 and the adjacent component, instead of surface contact. Also in this case, in a manner similar to FIG. 7, instead of the area of the figure obtained by projecting the contact group onto the substantially flat surface 5, a length of line segment of the figure obtained by projecting the contact group onto the substantially flat surface 5 is compared with a threshold set in advance, and the adoption suitability determination of the result for position posture measurement can thereby be performed. For example, as shown in FIG. 8B and FIG. 8C, a case in which each length of line segments $L_{2b}$ and $L_{2c}$ is longer than a threshold can be determined as an adopted posture. In contrast, as shown in FIG. 8D, a case in which the component point-contacts the substantially flat surface 5, instead of line-contact, and the length of line segment $L_{2d}$ is zero can be determined as non-adopted posture, and as shown in FIG. 8E, a case in which the length of line segment $L_{2e}$ is less than a threshold can be determined as non-adopted posture.

As described above, also with respect to the component that is formed to line-contact or point-contact the substantially flat surface 5, instead of face-contact, the length of the maximum line segment formed by a contact group is compared with a threshold, the adoption suitability determination can thereby be performed. Also with respect to the components that is formed to line-contact or point-contact the substantially flat surface 5, providing the determining unit 140 enables suppressing the transmittance of the erroneous detection or position and the posture measurement result that detected an unstable posture to the robot control unit, and consequently, the occurrence of the interference and collision can be suppressed. Note that, in the present embodiment, adoption appropriateness determination was performed based on the area and the length of line segment that are formed by points obtained by projecting the contacts. However, the present invention is not limited thereto, and it is possible to perform adoption appropriateness determination, based on the contacts, for example, three-dimensional coordinate of the contacts themselves, the position and the number of the isolated contacts, the tilt of the straight line passing through the two contacts in a given vertical plane, the tilt of the plane passing through a plurality of contacts, and the like.

(Article Manufacturing Method)

The measuring apparatus according to the embodiments described above may be used in the manufacturing method of articles. The article manufacturing method can include a process that performs a measurement of an object by using the measurement apparatus, and a process that performs processing of the object on which measurement has been performed in the process. The process may include, for example, at least one of machining, cutting, transporting, assembling, inspection, and selection. The device manufacturing method of the present embodiment has an advantage, as compared with a conventional method, in at least one of performance, quality, productivity and production cost of an article.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-204420 filed on Oct. 16, 2015, which are hereby incorporated by reference herein in its entirety.

What is claimed is:

1. An apparatus that utilizes machine vision to determine a position of a first object and/or a posture of the first object disposed on a surface in order to evaluate whether processing of the first object should be performed in view of the determined position and/or the determined posture of the first object on the surface, the apparatus comprising:
    an image sensor configured to image the first object; and
    a processor configured to:
        obtain first information of the position of the first object, the posture of the first object, or both the position of the first object and the posture of the first object based on an output of the image sensor,
        obtain second information of a contact between the first object and a second object different from the first object based on the output of the image sensor,
        perform an evaluation of the first information by projecting the contact between the first object and the second object to the surface on which the first object is disposed to determine a suitability of the first object for the processing based on the position of the first object, the posture of the first object, or both the position and the posture of the first object, and
        obtain a result of the performed evaluation indicating whether the processing of the first object should be performed based on the position of the first object, the posture of the first object, or both the position and the posture of the first object.

2. The apparatus according to claim 1, wherein the second object includes a surface on which the first object is disposed.

3. The apparatus according to claim 2, wherein the second object is disposed on the surface to which the contact between the first object and the second object is projected.

4. The apparatus according to claim 1, wherein the processor is configured to perform the evaluation based on a measurement of a figure obtained by projecting the contact between the first object and the second object to the surface on which the first object is disposed.

5. The apparatus according to claim 4, wherein the measurement includes an area, a length, a distance, or any combination thereof.

6. The apparatus according to claim 4, wherein the processor is configured to perform the evaluation based on whether the measurement falls within a tolerance.

7. The apparatus according to claim 1, wherein the processor is configured to obtain the first information based on image data obtained by the image sensor and a model of the first object.

8. The apparatus according to claim 7,
    wherein the processor is configured to obtain the first information based on an evaluation function for evaluating an error between the image data and the model, and perform the evaluation with respect to an object for which the first information is obtained with the evaluation function falling within a predetermined condition.

9. A method of utilizing machine vision to determine a position of a first object and/or a posture of the first object disposed on a surface in order to evaluate whether processing of the first object should be performed in view of the determined position and/or the determined posture of the first object on the surface, the method comprising:
    obtaining first information of the position of the first object, the posture of the first object, or both the position of the first object and the posture of the first object based on an output of an image sensor configured to image the first object, and second information of a contact between the first object and a second object different from the first object based on an image of the first object;
    performing an evaluation of the first information by projecting the contact between the first object and the second object to the surface on which the first object is disposed to determine a suitability of the first object for the processing based on the position of the first object, the posture of the first object, or both the position and the posture of the first object; and
    obtaining a result of the performed evaluation indicating whether the processing of the first object should be performed based on the position of the first object, the posture of the first object, or both the position and the posture of the first object.

10. A method of manufacturing an article, the method comprising:
    utilizing machine vision to determine a position of a first object and/or a posture of the first object disposed on a surface in order to evaluate whether processing of the first object should be performed in view of the determined position and/or the determined posture of the first object on the surface; and
    performing manufacturing the article after performing the processing of the first object,
    the utilizing machine vision including:
        obtaining first information of the position of the first object, the posture of the first object, or both the position of the first object and the posture of the first object based on an output of an image sensor configured to image the first object, and second information of a contact between the first object and a second object different from the first object based on an image of the first object;
        performing an evaluation of the first information by projecting the contact between the first object and the second object to the surface on which the first object is disposed to determine a suitability of the first object for the processing based on the position of the first object, the posture of the first object, or both the position and the posture of the first object; and obtaining a result of the performed evaluation indicating whether the processing of the first object should be performed based on the position of the first object, the posture of the first object, or both the position and the posture of the first object, wherein the article is manufactured in response to the result of the performed evaluation indicating that the processing of the first object should be performed.

* * * * *